Oct. 25, 1960    B. W. GUSTAFSON ET AL    2,957,299
RAKE TOOTH MOUNTING MEANS
Original Filed Nov. 24, 1958

*INVENTOR.*
B.W. GUSTAFSON &
A.E. BREED

United States Patent Office 2,957,299
Patented Oct. 25, 1960

2,957,299
RAKE TOOTH MOUNTING MEANS

Blaine W. Gustafson and Arie E. Breed, Ottumwa, Iowa, assignors to Deere & Company, Moline, Ill., a corporation of Delaware Continuation of application Ser. No. 775,993, Nov. 24, 1958. This application Dec. 31, 1959, Ser. No. 480

13 Claims. (Cl. 56—400)

This invention relates to a rake tooth means particularly for a side-delivery rake or equivalent implement, and this application therefor is a continuation of my copending application Ser. No. 775,993, filed November 24, 1958, now abandoned.

The general object of the invention is to provide an improved rake tooth means and mounting therefor, particularly a construction in which the mounting utilizes an elastomer block of rubber or equivalent material having a depending integral portion to which a metallic tine is rigidly carried. The advantage of the rubber block is that it will not take a permanent set, because of extreme or abnormal conditions, such as when the tooth is abnormally deflected laterally, as by jumping over an adjacent stripper bar. It is a specific object of the invention to provide the mounting means as an elastomer body having a block-like upper portion provided with an upwardly facing concavity for receiving the under surface of the rake bar, together with the integral depending portion in combination with a mounting clip or member having a U-shaped construction including an apertured bight through which the depending portion of the block extends and further having opposite arms or furcations which straddle the block as well as the rake bar, the furcations being apertured to receive securing means passing therethrough and through the bar. In the form of invention illustrated, it is a primary feature to provide an improved rake tooth mounting which may be substituted for conventional tine mountings on rakes already in the field so that a simple, inexpensive and convenient change-over may be effected.

The foregoing and other important objects and desirable features inherent in and encompassed by the invention will become apparent as a preferred embodiment of the invention is disclosed, by way of example, in the ensuing description and accompanying sheet of drawings, the several figures of which are described below.

Figure 1:
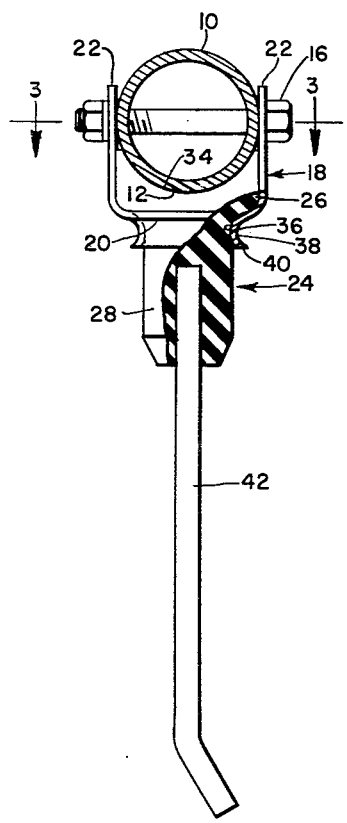
Fig. 1 is an end view, partly in section and with portions broken away, illustrating the improved mounting.
Figure 2:
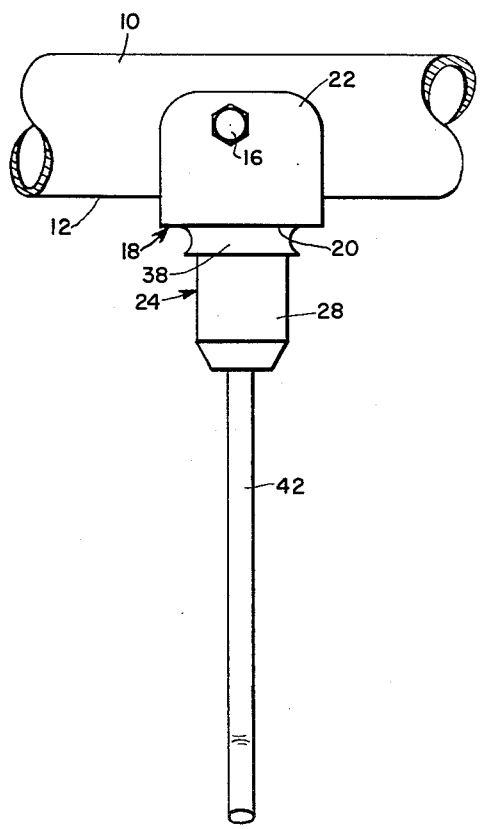
Fig. 2 is an elevation as seen at right angles to Fig. 1.
Figure 3:
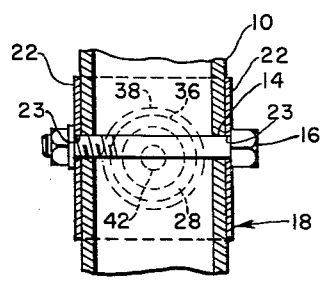
Fig. 3 is a section on the line 3—3 of Fig. 1.
Figure 4:
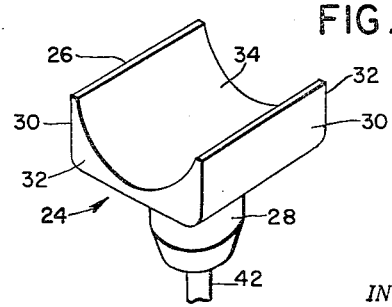
Fig. 4 is a perspective of the elastomer mounting element.

The numeral 10 represents a conventional or typical horizontal rake bar of cylindrical tubular section having a rounded undersurface 12 and a horizontal diametrically disposed mounting hole 14 conventionally adapted to receive a mounting bolt 16 as in the case of the mounting of conventional metallic tines. In the present case, and on the basis of replacement of the metallic tines with the improved tine forming the subject matter of the present invention, the prior mounting is removed, but the mounting hole 14 and bolt 16 are used in conjunction with a mounting clip or member 18 of U-shaped construction, having a lower horizontal bight 20 and a pair of integral upstanding arms 22, each of which is apertured at 23 for register with the mounting hole in the rake bar and so as to receive the mounting bolt 16.

An elastomer or equivalent rubber element 24 is mounted on the rake bar 10 by means of the bolt 16 and clip 18. This element comprises an upper block-like portion 26 and an integral depending lower cylindrical portion 28. The block has opposite upright flat sides 30 and opposite ends 32, and a cavity 34, facing upwardly, runs from end to end in the block and is shaped to conform to and to receive the undersurface 12 of the bar. The bottom or bight 20 of the clip 18 has a circular aperture 36 therein, bordered by a depending annular wall 38 through which the depending portion 28 projects a substantial distance below the wall. The wall is outwardly flared at 40 to allow limited flexing of the depending portion 28 without abrasion of the outer surface of the rubber.

The structure may be readily assembled in the field by first removing the old metallic tine and its mounting, retaining the bolt 16 if it is still usable. The rubber element 24 is inserted downwardly through the clip 18, with the arms 22 of the clip lying flatwise along opposite sides of the block. Thus, the block is prevented from turning in the clip. The height of the arms of the clip exceeds that of the block so that the arms project upwardly to straddle the rake bar 10 and so that the holes 23 therein register with the hole 14 in the rake bar. The bolt is replaced and the nut tightened thereon.

A metallic tine 42 is embedded in and depends from the depending portion 28 of the rubber element. In this sense, the tine may be regarded as secured to and forming an extension of the rubber element, and, the tine being relatively stiffer than the rubber, loads applied to the tine will be absorbed by the element as bending loads taken in the general area of the element surrounded by the wall 38 of the clip 18. The tine per se may have all the characteristics of a conventional tine.

Thus, it will be seen that a simple, inexpensive and convenient change-over is possible by use of the improved tine mounting means. Likewise, the means lends itself to installation as part of the original equipment of the side rake. The nesting of the undersurface of the rake bar in the cavity 34 of the block, in combination with the straddling of the rake bar by the arms 22 or the clip 18 affords a sturdy and compact mounting. Features of the invention in addition to those mentioned above will readily occur to those versed in the art, as will many modifications and alterations in the preferred embodiment, all of which may be exploited without departure from the spirit and scope of the invention.

What is claimed is:

1. Rake tooth means for mounting on a horizontal rake bar of the type having a rounded undersurface and a transverse horizontal mounting hole therein, comprising: an elastomer element having an upper block-like portion provided with opposite upright sides and opposite ends and having therein an upwardly facing concavity running from end to end and adapted to receive the undersurface of the bar, and said element having an integral lower portion depending generally centrally from said upper portion and of reduced cross-section as compared to said upper portion, and a tine secured to and depending from said lower portion; and a mounting clip of U-shaped construction, having a lower apertured bight through which the lower portion of the element projects downwardly and a pair of upstanding arms lying flatwise respectively along the sides of said upper portion, said arms being longer than the height of said upper portion and adapted to straddle the rake bar and said arms being apertured in alinement for register with the rake bar mounting hole.

2. The invention defined in claim 1, in which: the bight has a depending annular wall about the aperture therein and surrounding the proximate part of the depending lower portion of the element.

3. The invention defined in claim 2, in which: said wall has an outwardly flared annular bottom edge.

4. The invention defined in claim 1, in which: the depending portion of the element is cylindrical and the aperture in the bight is correspondingly circular.

5. Rake tooth means for mounting on a horizontal rake bar, comprising: an elastomer element having an upper block-like portion provided with opposite upright sides and opposite ends and having therein an upwardly facing concavity running from end to end and adapted to receive the bar from below, and said element having an integral lower portion depending generally centrally from said upper portion and of reduced cross-section as compared to said upper portion, and a tine secured to and depending from said lower portion; and a mounting member having a lower apertured part through which the lower portion of the element projects downwardly and upstanding means engaging and projecting upwardly past the sides of said upper portion and adapted for connection to the rake bar.

6. Rake tooth means for mounting on a horizontal rake bar, comprising: an elastomer element having an upper block-like portion provided with opposite upright sides and opposite ends and having therein an upwardly facing concavity running from end to end and adapted to receive the bar from below, and said element having an integral lower portion depending generally centrally from said upper portion and of reduced cross-section as compared to said upper portion, and a tine secured to and depending from said lower portion; and a mounting member having a lower apertured part through which the lower portion of the element projects downwardly and upstanding means engaging and projecting upwardly past said upper portion and adapted for connection to the rake bar.

7. Rake tooth means for mounting on a horizontal rake bar, comprising: an elastomer element having an upper block-like portion adapted to lie proximate to the rake bar and having integral therewith a depending lower portion of reduced cross-section, and a tine of relatively stiff material different from that of said element and secured to and depending from said lower portion substantially as an extension thereof; and a relatively rigid mounting member having a lower apertured part through which said lower portion projects downwardly and further having upstanding means engaging and projecting upwardly past said upper portion and adapted for connection to the rake bar.

8. The invention defined in claim 7 in which: the apertured part is ring-like and has a depending annular wall about the aperture and surrounding the proximate part of the depending lower portion of the element.

9. Rake tooth means for mounting on a rake bar, comprising: a mounting block of elastomer material having a first end proximate to the bar and a second end spaced from the bar in a direction normal to the length of the bar; U-shaped means at said first end and connected to the block, said U-shaped means including a bight portion shaped to conform to the proximate portion of the bar and a pair of leg portions adapted to straddle the bar, said leg portions being apertured on a line transverse to the length of the bar for receiving fastener means to secure said block to the bar, said U-shaped means in at least said bight portion being of relatively rigid material other than that of the block and having an opening therein, and said block having a portion entering said opening to improve the connection between said block and said U-shaped means, and a relatively rigid rake tooth of material other than that of the block and secured to and projecting from the second end of the block generally as an extension of the block.

10. The invention defined in claim 9, in which: at least a part of said first end of the block projects through said opening toward the bar to provide a bar-proximate surface generally conforming in shape to that of the proximate portion of the bar.

11. Rake tooth means for mounting on a rake bar, comprising: a mounting block of elastomer material having a first end proximate to the bar and a second end spaced from the bar in a direction normal to the length of the bar; U-shaped means at said first end and connected to the block, said U-shaped means including a bight portion shaped to conform to the proximate portion of the bar and a pair of leg portions adapted to straddle the bar, said leg portions being apertured on a line transverse to the length of the bar for receiving fastener means to secure said block to the bar, said U-shaped means in at least said bight portion being of relatively rigid material other than that of the block, said block and said bight portion having interlocking elements including an opening in said bight portion and an integral block portion received in said opening.

12. Rake tooth means for mounting on a rake bar, comprising: a mounting block of elastomer material having a first end proximate to the bar and a second end spaced from the bar in a direction normal to the length of the bar; U-shaped means at said first end and connected to the block, said U-shaped means including a bight portion shaped to conform to the proximate portion of the bar and a pair of leg portions adapted to straddle the bar, said leg portions being apertured on a line transverse to the length of the bar for receiving fastener means to secure said block to the bar, said U-shaped means including a U member of relatively rigid material having a bight generally conforming to said bight portion and legs at least in part providing said leg portions, said U member having a perforation in addition to the aforesaid apertures and said block having an integral portion interlocking with said perforation.

13. The invention defined in claim 12, in which: portions of the block in addition to said interlocking portion extend along said legs to improve the connection between said block and member.

References Cited in the file of this patent

UNITED STATES PATENTS

| | | |
|---|---|---|
| 1,780,748 | Fisher | Nov. 4, 1930 |
| 2,328,121 | Bartek | Aug. 31, 1943 |
| 2,697,905 | Moriarty | Dec. 28, 1954 |
| 2,704,150 | Scranton | Mar. 15, 1955 |
| 2,888,993 | Dunning | June 2, 1959 |

FOREIGN PATENTS

| | | |
|---|---|---|
| 379,808 | Great Britain | Sept. 8, 1932 |
| 668,783 | Great Britain | Mar. 19, 1952 |